United States Patent [19]

Hashimoto et al.

[11] 4,247,190
[45] Jan. 27, 1981

[54] LENS ASSEMBLY COUPLING DEVICE FOR CAMERA SYSTEM

[75] Inventors: Shigeru Hashimoto; Taizo Mitani, both of Yokohama; Takashi Isobe, Tokyo; Masao Aoyagi, Kanagawa; Akiyasu Sumi, Kawasaki; Katsumi Tanaka, Tokyo, all of Japan

[73] Assignee: Canon Kabushiki Kaisha, Tokyo, Japan

[21] Appl. No.: 872,102

[22] Filed: Jan. 25, 1978

[30] Foreign Application Priority Data

Feb. 4, 1977 [JP] Japan .................................. 52/11280

[51] Int. Cl.³ .......................... G02B 7/14; G03B 17/14
[52] U.S. Cl. .................................... 354/286; 350/257; 354/202
[58] Field of Search ................. 354/286, 202, 295, 46; 350/257

[56] References Cited

U.S. PATENT DOCUMENTS

| 3,130,658 | 4/1964 | Baur et al. ............................ 354/46 |
| 3,906,534 | 9/1975 | Shirasaki ............................. 354/286 |
| 3,974,513 | 8/1976 | Waaske ............................... 354/295 |
| 4,003,068 | 1/1977 | Hashimoto et al. ................. 354/286 |
| 4,063,264 | 12/1977 | Ando et al. ......................... 354/286 |
| 4,104,649 | 8/1978 | Tanaka et al. ................... 354/286 X |
| 4,107,706 | 8/1978 | Ueda et al. ..................... 354/286 X |

Primary Examiner—J. V. Truhe
Assistant Examiner—Shelley Wade
Attorney, Agent, or Firm—Toren, McGeady and Stanger

[57] ABSTRACT

An interchangeable lens assembly for a camera is formed with a bayonet coupling affixed to the lens barrel with both being rotatable relative to an adapter shell. Upon attachment of the lens assembly to a camera housing, a detent pin is retracted from a fitted hole found in a radial flange of the adapter shell and the lens barrel is thereby rendered rotatable together with the bayonet coupling with reference to both the adapter shell and the camera housing while the adapter shell is held stationary relative to the camera housing during mounting and dismounting of the lens assembly.

21 Claims, 15 Drawing Figures

LENS ASSEMBLY COUPLING DEVICE FOR CAMERA SYSTEM

BACKGROUND OF THE INVENTION

1. Field of the Invention

This invention relates to photographic cameras in general, and more particularly to a method of establishing accurate and reliable engagement between a front attachment such as a lens assembly and a basic structure which constitutes the camera system.

2. Description of the Prior Art

The invention relates to camera systems which include an attachment such as an interchangeable lens, intermediate tubular member, filter or adapter lens which is required to engage a basic structure such as a camera housing, or lens holder with a very high degree of accuracy with regard to positioning control. This requirement arises due to the fact that any error in coordination between the parts, however small, will result in serious failure with regard to assuring adequate lens performance in the particular camera system. A wide variety of coupling methods for such camera systems have been proposed. In the case of interchangeable lenses of standard fixed focal length or of the zoom type as the attachment for the camera housing, the conventional types of coupling devices may be classified into three main categories: one is what is called "multi-revolution screw mounting", as for example, disclosed in U.S. Pat. No. 3,682,069. This device is constructed with an inner and outer screw-thread, the latter being formed on an adapter shell which constitutes the rear end of the lens holder. By bringing this thread into axial alignment with the other and then rotating the lens along with the holder itself relative to the camera housing, a particular position of the holder for angular alignment is first sought. Further rotation is initiated to continue coupling operation as the lead angle of the mating threads is acted upon, until the radial shoulder of the adapter shell comes to abut against the position adjusting surface of the front panel of the camera housing. For assurance of a sufficiently rigid connection between the lens holder and the camera housing, it is required to apply an excess force to the lens holder for frictional rotation between the radial shoulder and the mount reference surface. Such coupling operation as is associated with the establishment of phase coincidence between the two threads followed by a number of revolutions of the lens holder in a fitted manner to the camera housing is troublesome and time-consuming. Another disadvantage is that the final angular position of the lens holder relative to the camera housing depends upon the force exerted to effect the rugged screw connection therebetween. This strong frictional movement of the radial shoulder of the adapter shell over the mount reference surface gives rise to a problem because of unevenness created in that surface and further axial shift thereof due to the wear or scratching of material from the reference surface.

Another category is what is called "bayonet coupling". This device comprises male and female bayonet members fixedly carried on the lens holder and the camera housing respectively. During coupling operation, the male bayonet member is slidably fitted to the female bayonet member and then turned by rotating the lens holder about the optical axis while the camera housing is maintained stationary. In this case, the range of rotation of the lens holder is limited by a stopper provided either in the lens holder or in the camera housing in order to insure that the angular alignment of the lens holder relative to the camera housing in the finally coupled position can be controlled with very high accuracy. This feature makes it possible to provide transmission of mechanical or electrical control signals between the lens aperture mechanism and the diaphragm control mechanism, the latter being incorporated in the camera housing. Likewise as in the aforementioned screw-mounting method, it is impossible to avert the defect that the position defining surface of the camera housing is worn away before a long period of use with frequent interchanges of attachments.

In order to obviate this defect, a third coupling device has been proposed as disclosed in U.S. Pat. No. 3,906,534. According to this proposal, one of the two bayonet coupling members is made movable with reference to its carrier and is constructed in the form of a narrow ring arranged to be journalled around the adapter shell which solidly or rigidly formed as part of the lens barrel or lens holder body. To achieve proper attachment of the lens assembly, after the adapter shell is slidably fitted to the camera housing in an adjusted angular position, the operator must to change the position of his hand from the front part of the lens assembly to the clamping ring constituting the bayonet member in order to turn the ring in the tightening direction. As the adapter shell remains stationary in the accurately adjusted position relative to the camera housing, and since the adapter shell and the lens barrel are essentially formed as a single rigid portion of the lens assembly, the provision of signal transmission, for example for controlling the diaphragm aperture or the shutter speed, may be made there between, and the common disadvantage of the first and second coupling devices, that is, the occurrence of undesired deviation of the positioning between the control elements of the lens assembly and of the camera housing, can be eliminated. But, an alternate disadvantage is introduced because of the requirement of locating the clamping ring in a narrow space adjacent the front panel of the camera housing. Thereby the ease of establishing proper engagement between the lens holder and the camera housing is reduced to a considerable extent because it becomes necessary to grasp a relatively narrow coupling ring located adjacent the camera housing when coupling and decoupling is to be effected. In this third coupling device, the coupling or clamping ring is operated members or rings must be produced at a location so as usually located on the lens holder. When the camera housing is designed to have a forwardly projecting section protruding over the coupling ring, for example, a range finder housing extending from the front panel over the clamping ring, and/or a motor drive unit attached to the bottom of the camera housing, these protuberances make it difficult or impossible for the operator's hand to obtain access to the clamping ring.

Such construction of the coupling device for the attachment of the lens assembly has heretofore diminished the degree of design flexibility which would otherwise allow camera systems or broadened capabilities.

In the lens holder, there are provided a diaphragm mechanism and focusing mechanism for which respective manually operated members or rings must be provided at a location so as to afford ease of operation. As that part of the peripheral surface area of the lens holder which remains stationary during focusing and/or zooming is relatively narrow in the longitudinal direction, such a requirement limits the availability of the space which is intended to be occupied by the clamping ring. Particularly with the camera of reduced size, that space is correspondingly reduced in the longitudinal direction. In addition, the location of the clamping ring is limited to the vicinity of the camera housing. These conventional design features make it difficult to accomplish reliable engagement between the lens assembly and the camera housing.

Since the lens and the camera body though very heavy are connected through the narrow ring whose ends are not fixed permanently to their casing, there is a high possibility that staggering movement of the lens about the optical axis of the camera body will occur. As a result mechanical and optical performance will suffer from the slight external shock. In order to avoid this drawback, the production run of the coupling elements must be performed while holding all of the design parameters to more specific values. This limits the selection of materials from which the elements are made up. Therefore, it is impossible to manufacture the coupling device economically.

With the foregoing in mind, the present invention has for its general object to provide a novel coupling device for camera systems wich will overcome the aforementioned drawbacks of conventional coupling devices.

An object of the invention is to provide a coupling device adapted to be used in attachments which constitute part of the camera system.

Another object is to provide an attachment with a coupling device rendering it possible to establish engagement with a basic structure in an accurately adjusted relative position without the necessity of unduly large modification of the mounting in the basic structure.

Another object is to provide an attachment comprised of an adapter which remains stationary during coupling operation so that reliable transmission of mechanical, electrical or other physical control signals can be assured between the coupled attachment and basic structure.

Another object is to provide an attachment having a coupling device fixedly secured thereto so that the coupling operation can be performed by the operation by grasping the casing of the attachment at desired parts remote from the casing of the basic structure, while nevertheless assuring accurate and reliable transmission of the control signals in the finally engaged position.

SUMMARY OF THE INVENTION

Briefly, the invention may be described as an interchangeable lens assembly for a camera comprising lens barrel means having at least one operative component of the lens assembly mounted therewith, coupling means fixed on the lens barrel means adapted to be brought into locking engagement with complementary coupling means on the camera for releasably mounting the lens assembly in operative position on the camera, adapter means mounted on the lens barrel means in rotative relationship relative thereto for establishing predetermined relative positioning between the interchangeable lens assembly and the camera, and retainer means adapted to be brought into engagement with complementary retainer means on the camera body for retaining said adapter means in fixed rotative position relative to said camera body during mounting and dismounting of the interchangeable lens assembly on the camera body.

By a further aspect of the invention, there is also provided, releasable interlocking means for locking the lens barrel means in rotatively fixed engagement with the adapter means when the lens barrel means and the adapter means are in a predetermined rotative position relative to each other and for releasing said fixed engagement when the interchangeable lens assembly is brought into mounting engagement with said camera.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1A:
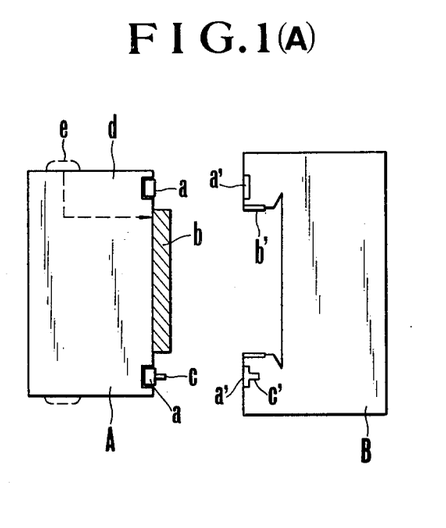
FIGS. 1(A) and 1(B) are schematic diagrams showing the principles of the invention, with FIG. 1(A) showing an attachment and a basic structure in separate positions from each other and FIG. 1(B) showing establishment of a camera system from then in the coupled position.
Figure 1B:
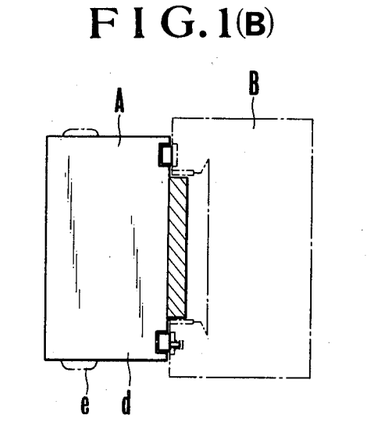

FIGS. 1(A) and 1(B) show a camera system comprised of an attachment A and a basic structure B. Specific examples of items which may comprise the parts A and B; are an interchangeable objective lens A and a camera housing B, or an intermediate tube A and an objective lens B, or a filter A and an interchangeable lens B, and so forth. The front attachment A is generally formed in a tubular casing d whose rear end constitutes an adapter shell a and is provided with a coupling device b which may be linked to an operating member or ring e as schematically shown by dashed lines. The adapter shell a is either fixedly secured to the casing, or movably retained therein, depending upon which of the casing d and the ring e is fixedly connected to the coupling member b as the case may be. To achieve correct angular alignment of the adapter shell a to the basic structure B, there is provided a position defining pin c located on the rear surface of the adapter shell a and positioned during engagement between the parts A and B, the pin c being slidably fitted to a hole c' formed in the basic structure B.

When the attachment A is brought into contact with the basic structure B, while the angular position of the attachment A is controlled to place the pin c in alignment with the hole c', the adapter shell is first slidingly fitted in part to be received in an annular interior recessed portion a', formed in the basic structure B. Subsequent thereto, the operator turns the attachment housing d by grasping any desired part thereof, or the actuator sleeve e about the axis of the optical system in the attachment housing with reference to the stationary basic structure B. Thus, the attachment housing is driven to axially advance by the drive engagement of the coupling member b for example, in a male screw thread form with a female screw thread b' until the adapter shell a abuts against the bottom surface of the recess a' which functions to define the predetermined position and orientation of the attachment A relative to the basic structure B.

It is to be understood from the foregoing that what would otherwise damage the accuracy of alignment control in coupling of the components of a camera system as by occurrence of abrasion and scratching at a and a' is avoided, and that the possibility of manipulating the attachment A at a point remote from the basic housing structure to secure easy accessibility thereto, that is, at the attachment body itself, or at the actuator sleeve e during coupling operation, operates to facilitate accurate and reliable establishment of the camera system. One of the novel features of the invention concerns the provision of an actuating member for the coupling device made rotatable relative to the adapter shell by at least one component of the attachment A.

The term "one component of the attachment" herein used means one of the components of the attachment other than those located in the rear end portion thereof and united directly to the coupling member such as a bayonet coupling to assist in uniting A and B in the coupled position. Such component, for example, in the case of lens attachments, may comprise the lens holder, diaphragm ring, zoom control ring, distance adjusting or focusing ring, hood sleeve and other suitable component provided on the lens barrel or tubular body of the lens attachment or assembly.

Referring to FIGS. 2 to 5, there is shown one embodiment of a coupling device according to the present invention applied to a camera system comprising an interchangeable lens optical system or assembly as the attachment and a camera body as the basic structure. The optical system includes a front lens member movable for focusing and a diaphragm. The stationary lens members and the diaphragm are held in a common tubular body or barrel 1, while the focusing member is fixedly mounted in a cell (not shown) slidably fitted to the interior of the lens barrel 1 and connected by a pin extending therefrom through a cam slot provided in the barrel 1 to an intermediate helicoid sleeve with which a focusing ring 2 is united. Upon rotation of the focusing ring 2 relative to the lens barrel 1, the front lens member is axially moved. A diaphragm ring 5 is provided to operate the diaphragm.

Figure 3:
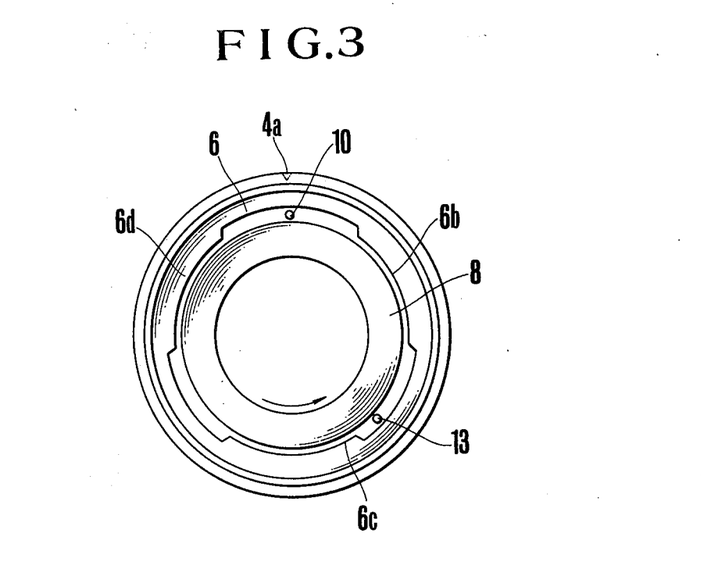
FIG. 3 is a rear elevational view of the lens holder structure of FIG. 2.

A coupling device of the invention includes an outer casing in the form of a ring 4 fixedly secured to the lens barrel 1 at the rear end thereof and having a cylindrical interior recess to receive a bayonet member 6 restrained from rotative movement relative to the ring 4 by fastening screws (not shown). The rear end of the ring is bent inwardly to prevent the bayonet member 6 from being extracted as a very large force is applied thereto when the bayonet member 6 is engaged with a corresponding or complementary bayonet member 25 (see FIG. 5) provided in the front panel of the camera housing during mounting of the lens assembly. The bayonet member 6 has three arcuate radial flanges 6b, 6c and 6d equally spaced from each other as shown in FIG. 3 to form open spaces therebetween which are aligned with and generally correspond to the three arcuate radial flanges 25a, 25b and 25c of the bayonet member 25 for the purpose to be described hereinafter.

Figure 2:
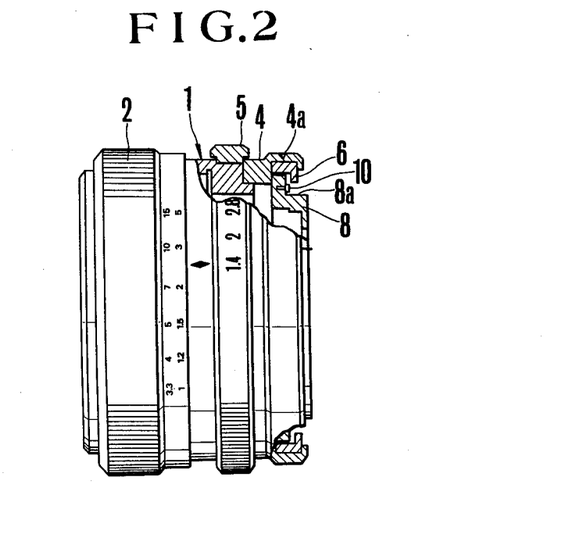
FIG. 2 is a side elevational view of one embodiment of the invention applied to an interchangeable objective lens with a part broken away to illustrate a fixed relation of a male bayonet coupling member to the lens holder.

Freely fitted to a cylindrical interior recess formed in the bayonet ring body 6 and in axial abutment to the radial shoulder of the body of ring 4 is an adapter shell 8 whose rear end is formed to a cylindrical configuration of a smaller outer diameter than the inner diameter of the bayonet ring with the resulting outer periphery 8a serving as a lateral position defining and light-tight member when inserted into a circular opening formed in the front panel of the camera housing. The front end of the adapter shell 8 provides a radial annular flange whose rear radial shoulder serves as a longitudinal position defining member, and on which an angular position defining pin 10 is fixedly mounted in alignment with the center of the area of the space between the arcuate flanges 6b and 6d. In radial alignment with the pin 10 is provided an angular position indicating mark 4a cut on the outer peripheral surface of the ring 4 to assist in bringing the lens assembly into axial contact with the camera body in a predetermined angular position. Since the ring 4 is fixedly secured to the lens barrel 1 and since the bayonet member 6 is fixedly secured to the ring 4, rotation of the lens barrel 1 will operate to effect rotation of the bayonet member 6.

Figure 4:
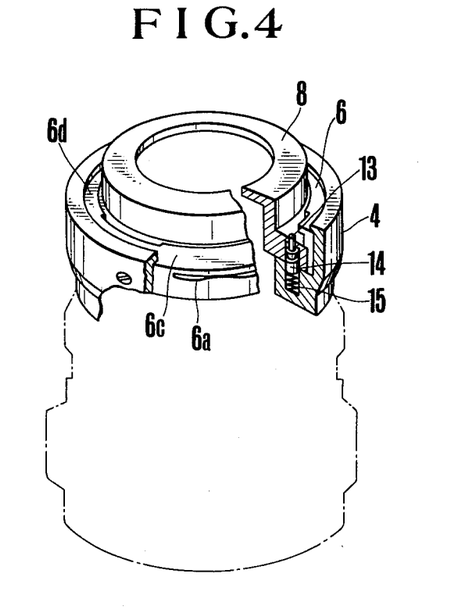
FIG. 4 is a fragmentary perspective view of the lens holder structure of FIG. 2 with a part broken away to illustrate an example of construction and arrangement of a detent mechanism.

The adapter shell 8 is mounted to be rotatable relative to the lens barrel 1 but it may be locked against rotation relative thereto by an interlocking means or mechanism which is also operative for releasing connection of the coupling 4, 6 from the adapter shell 8 in automatic response to the placement of the lens assembly in position for mounting whereby the bayonet coupling member 6 is brought into engagement with the member 25. This mechanism includes an actuator pin 13 slidably fitted in an axial hole which is formed in the radial abutment flange of the adapter shell 8 as shown in FIG. 4. The mechanism further includes a detent pin 14 seated in a fitted axial hole formed in the casing 4 and biased by an expansion spring 15 so that the detent pin 14 projects snugly into an accommodating hole formed in the adapter 8, causing the actuator pin 13 to extend out of the abutment radial shoulder of the adapter shell 8, so long as the lens is detached from the camera body. Thus, the adapter shell 8 is secured in the predetermined angular position relative to the assembly comprised of the ring and bayonet member 4, 6 and the barrel 1, before the lens is attached to the camera body. As shown in FIG. 4, the bayonet member 6 is provided with circumferential slits 6a bored through the wall of the axially extending annular portion thereof in radial alignment with the respective pawls 6b, 6c and 6d to impart into the bayonet member 6 a resilient property in the axial direction of the lens barrel 1. This serves to effect the full length of rotative movement of the coupling device with respect to the adapter shell 8, as the restraining action which would otherwise arise between the two coupling members 6 and 25 does not occur.

Figure 5:
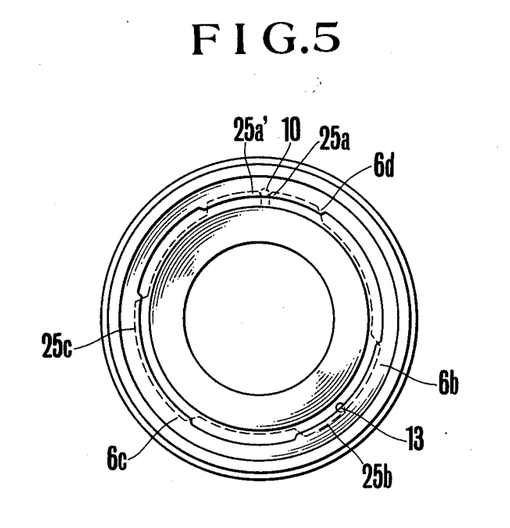
FIG. 5 is an elevational view of a complete coupling device in combination with a position defining pin and a detent pin.

When the lens attachment of the construction described above and the camera housing, which are commercially available in a camera body sold under the tradename Canon FTb, for example, are to be assembled to establish a complete camera structure, the operator will insert the adapter shell 8 at its rear end outer diameter 8a into the fitted opening of the camera housing by grasping the lens barrel 1 with axial alignment of the angular position indicating mark 4a with an index not shown provided at a corresponding point on the front panel of the camera housing, the bayonet pawls 6b, 6c and 6d are slidably fitted to the respective slots of the bayonet member 25 of the camera housing which, upon further travel, abut against the radial shoulder of the adapter shell 8. At the final stage, the pin 10 enters a recess 25a' (see FIG. 5) of the camera housing, and the actuator pin 13 is pushed against the force of the spring 15 with the interface between the pin 13 and the detent pin 14 being finally aligned with the abutment shoulders of the adapter shell 8. The clamping ring 4 enables the operator to rotate the lens barrel 1 about the optical axis of the lens system with reference to the camera housing, while maintaining the adapter shell 8 stationary as it is restrained from rotation by the pin 10 engaging in the recess 25a'. When the range of rotation of the lens barrel 1 has reached about 60 degrees, the bayonet pawls 6b, 6c and 6d overlay those 25b, 25c and 25a of the opposite bayonet 25 respectively as shown in FIG. 5, and the stress force applied to the bayonet coupling 6, 25, becomes maximum. To prevent a further rotation from occurring, a stopper may be provided to limit the range of rotation of the lens barrel 1.

To disengage the lens attachment from the camera housing, the lens barrel 1 is rotated in the opposite direction. As the adapter shell 8 is restrained from rotative movement by the angular position defining pin 10 engaging with the bayonet member 25 of the camera housing, the coupling device 4 is rotated with respect to the stationary adapter shell 8. Upon occurrence of alignment of the mark 4a with its index, the bayonet pawls 6b, 6c and 6d are generally displaced from the respective bayonet pawls 25b, 25c and 25a, and the operator is able to move the attachment axially away from the camera housing. As increasing gaps are created between the radial shoulder of the adapter shell 8 and the bayonet surface 25, the detent pin 14 together with its actuator pin 13 are driven by the spring 15 to project out of their respective fitted holes. Thus, the adapter shell 8 regains the initial relative angular position to the lens barrel 1 as shown in FIG. 4 and the interlocking means comprised of the pins 13 and 14 and the spring 15 again lock the adapter shell 8 against rotation relative to the assembly consisting of the ring 4, bayonet member 6 and the lens barrel 1.

Therefore, all what the operator need do in establishing accurate and reliable engagement between the lens attachment and the camera housing is to accomplish the axial alignment of the mark 4a with the index. Instead of using the bayonet members 6 and 25, male and female screw thread members may be used respectively to effect an equivalent result. In this case, it is preferred to limit the range of rotation of the lens barrel to less than one revolution, for the pitch is so designed.

As is evident from the above, because frictional action between the adapter shell 8 and the camera housing during the coupling and fixedly securing is eliminated, no error of mechanical and optical coordination which would otherwise arise by damage resulting from abrasion and scratching occurs. Further, since the coupling device normally involving difficult accessibility is fixedly secured to the lens barrel 1 with a large surface area of easy accessibility, the operator can easily effect the coupling and securing operation with small manual torque to establish sturdy coupling of the attachment to the basic structure.

Figure 6:
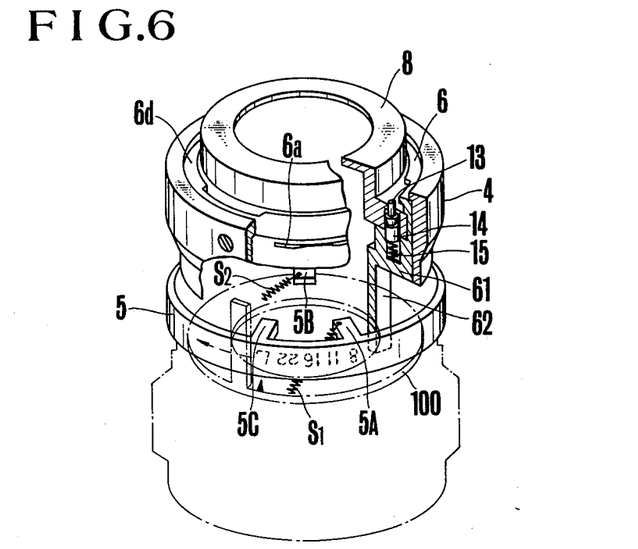
FIG. 6 is a fragmentary perspective view of another embodiment of an interchangeable objective lens holder structure according to the invention with its diaphragm ring operatively connected to the bayonet coupling member.
Figure 7:
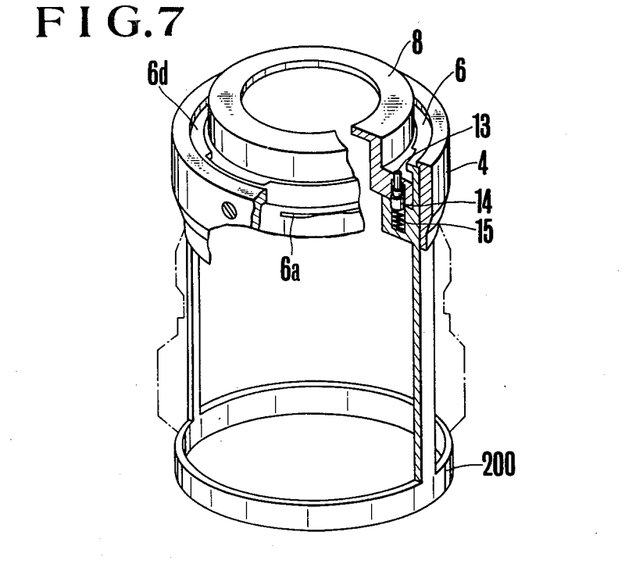

FIG. 6 shows another embodiment of the invention applied to a camera system similar to that of the above embodiment but which differs from the latter only in that the diaphragm ring is utilized as an actuator for the coupling device. The same reference numerals have been employed in the figure to denote parts similar to or like those shown in FIGS. 2 to 5. Whilst the casing or ring 4 is fixedly secured to the lens barrel 1 in a similar manner to that shown in FIGS. 2 to 5, it is slightly modified as axially elongated to receive not only the bayonet ring 6 but an annular support member of the same outer diameter as that of the bayonet ring 6 in end-to-end relation. The bayonet ring 6 is fixedly fitted to the interior recess of the ring 4 by screws or the like and is integrally formed with the support member 61. The adapter shell 8 has the radial flange rotatably seated against the rear end of the support member 61 and freely fitted to an annular interior recess of the bayonet ring 6. The support member 61 has an arm 62 forwardly extending into either of the paths of movement of two radial projections 5A and 5B of the diaphragm ring 5 so that when the diaphragm ring 5 is turned beyond the lower limit (minimum aperture size) of a range of diaphragm values, the first projection 5A is brought into drive engagement with the arm 62 to rotate the bayonet ring 6 in a tightening direction provided that the lock mechanism 13, 14 and 15 is in the idle position. When the diaphragm ring 5 is turned beyond the upper limit of the diaphragm value range, the second projection 5B is brought into drive engagement with the arm 62 to rotate the bayonet ring 6 in the reverse direction. The diaphragm ring 5 is placed in registry at any one of the diaphragm values available with the stationary index mark. A preset control cam 100 is operatively connected at an upwardly extending arm thereof to a radial projection 5C of the diaphragm ring 5 by either of two shock absorbing springs $S_1$ and $S_2$, thereby making it possible to transmit motion of the diaphragm ring 5 to the diaphragm mechanism through the cam 100.

Of course, as will be apparent from the foregoing description, any rotational movement of the lens barrel 1 will tend to cause turning of the bayonet member 6. Since in most lens assemblies typically structured in accordance with the prior art, there is normally provided a diaphragm ring and a focusing ring mounted on the lens barrel, and since these members only rotate within a fixed angular range relative to the lens barrel, when either of the focusing ring or diaphragm ring abut against stop means normally provided in a lens assembly, they will also tend to rotate the lens barrel and thereby act to turn the bayonet member of the present invention in a manner similar to that involved in the embodiment of FIG. 6 with regard to the diaphragm ring 5.

Figure 8:
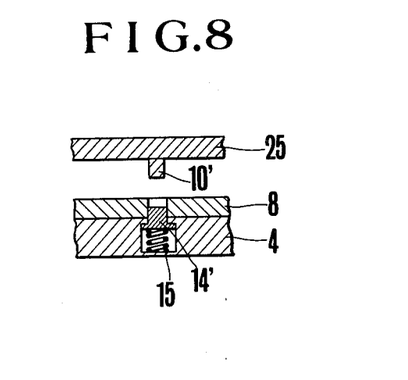
FIG. 8 is a sectional view of an improved detent mechanism.

An example of modification of the adapter shell detent mechanism is shown in FIG. 8, wherein the same reference numerals have been employed to denote the similar parts to those shown in FIG. 4. In this example, the relative angular position defining pin 10' is disposed not on the adapter shell 8 but on the camera housing at the bayonet member 25 and also serves as the actuator pin 13 for the detent pin 14'. This detent pin 14' has a head against which the spring 15 is pressed to urge the detent pin 14' to project into the accommodating hole formed in the adapter shell 8. When the lens attachment is brought into axially abutting contact with the camera body in the adjusted position where the mark 4a is aligned with the index, the pin 10' is slidably fitted to the accommodating hole, while pushing the detent pin 14' against the force of spring 15, with the final result that the abutment ends of the pins 10' and 14' are in the same plane as that for those of the adapter shell 8 and the coupling device 4 to enable the operator to proceed to the next step of rotative movement of the lens barrel 1 along with the coupling device. Thus, the establishment of the relative angular position adjustment of the adapter shell 8 and the lock release of the coupling device from the adapter shell 8 can be simultaneously achieved.

Figure 9:
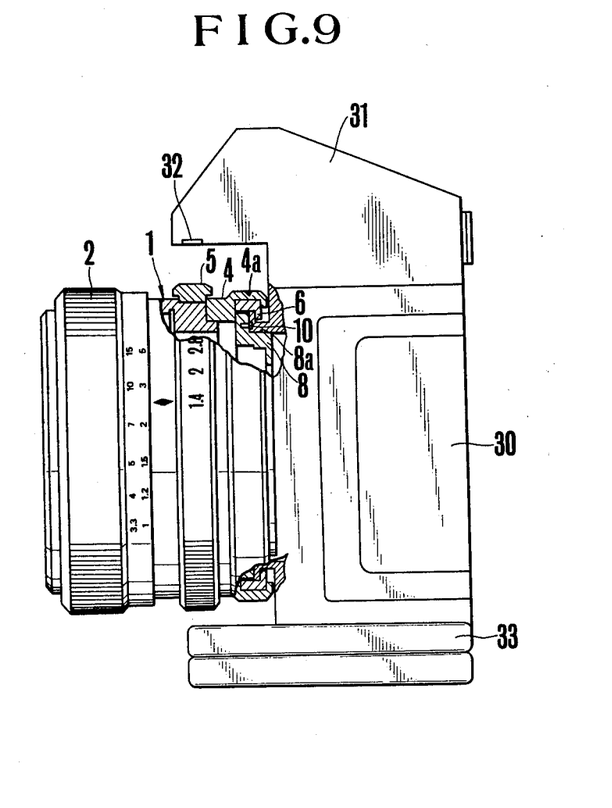
FIG. 9 is a partly side elevational partly sectional view of the objective lens of FIG. 2 attached to a camera housing equipped with forwarding extending sections making it difficult to access the coupling member directly.

FIG. 9 shows a practical application of the lens attachment of FIG. 2 in camera bodies with large forwardly extending sections. The illustrated camera body 30 carries a finder housing 31 forwardly elongated to overlay above the diaphragm ring 5 far ahead of the coupling device 4, for accommodation of a diaphragm value scale read out device having a window 32 positioned on the front bottom surface of the finder housing in radial alignment with the diaphragm ring 5. At the bottom of the camera housing there is shown a film winding (or rewinding) drive unit or section 33 detachably or permanently mounted thereon. As this unit 33 is also overlaid below the coupling device 4, the accessibility to the coupling device 4 is impeded by these forward projections and the operator is unable to perform coupling with ease of manipulation. But, the present invention enables the operator to grasp the lens barrel 1 located ahead of these projection in performing the coupling operation.

Figure 10A:
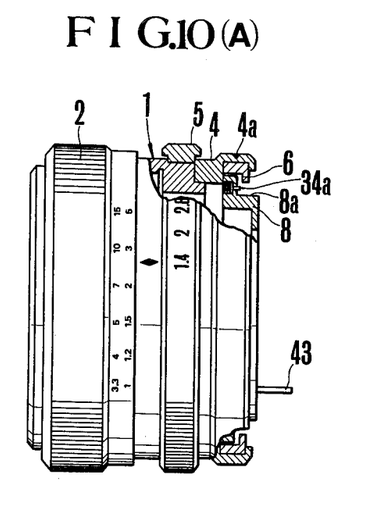
FIGS. 10(A) to 10(E) show an example of construction and arrangement of signal transmission between the attachment and the basic structure, with FIGS. 10(A) and 10(B) being similar views to those of FIGS. 2 and 3 respectively, FIG. 10(C) being a partly perspective partly sectional exploded view of the transmission of a signal representative of a preset diaphragm value in the lens holder, FIG. 10(D) being a sectional view of a camera housing as the basic structure, and FIG. 10(E) showing the details of the part of the signal transmission which is provided in the camera housing.
Figure 10B:
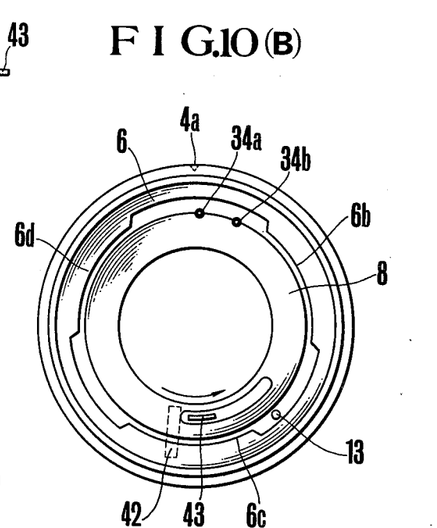
Figure 10C:
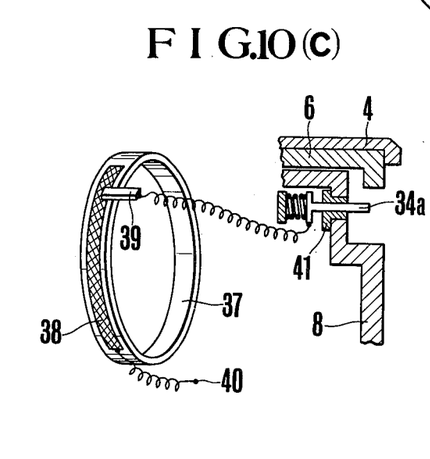

FIGS. 10(A) to 10(C) show an example of the construction and arrangement of that part of an electrical signal transmission which is provided in the attachment as applied to the objective lens of FIGS. 2 to 5. As the adapter shell 8 remains stationary relative to the camera body of FIGS. 10(D) and 10(E) during the coupling operation, a pair of electrical contact pins 34a and 34b are positioned on the radial abutment shoulder of the adapter shell 8 as shown in FIG. 10(B). The pin 34a serves as the position defining pin 10 of FIG. 2. Both of the pins 34a and 34b are slidably fitted to respective holes formed in an electrically insulating support member 41 and they are urged by means of springs to project outwardly therefrom toward the camera body as shown in FIG. 10(C). At this pair of pins 34a and 34b there appears an electrical signal representative of the set value of the diaphragm aperture established by the ring 5 by way of leads terminating at a slider 39 and one end of a resistance track 38 respectively, the latter being deposited on the peripheral surface of a ring 37 which is fixedly secured to the lens barrel 1. The slider 39 is arranged to cooperate with the diaphragm ring 5. An additional signal transmission of similar construction to the above may be provided for association with the distance adjusting ring 2. On the abutment shoulder of the adapter shell 8 is also provided an arm 43 for actuation of the closing operation of the diaphragm, as shown in FIG. 10(B).

Figure 10D:
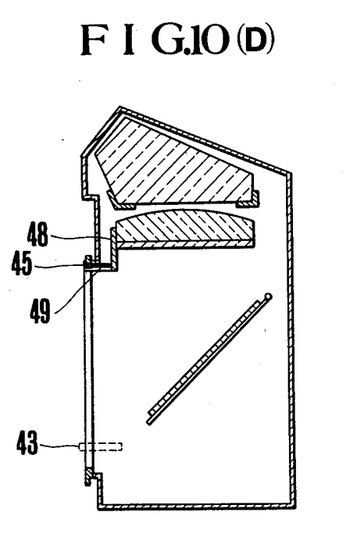
Figure 10E:
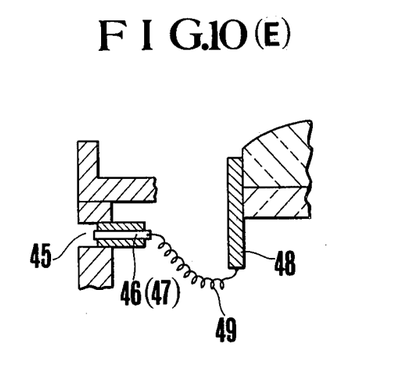

FIGS. 10(D) and 10(E) show that part of the signal transmission apparatus which is located or provided in the camera body. For reception of the electrical contact pins 34a and 34b, a pair of fitted holes 45 are formed on the abutment surface of the camera body, and into which are projected respective electrical contact pins 46 and 47 connected by way of leads to a signal processing unit 48. An automatic operating member for the arm 42 is indicated at 43.

It will be appreciated that the coupling device of the invention facilitates accurate and reliable establishment of a signal transmission and operative connection between the attachment and the basic structure.

Figure 11:
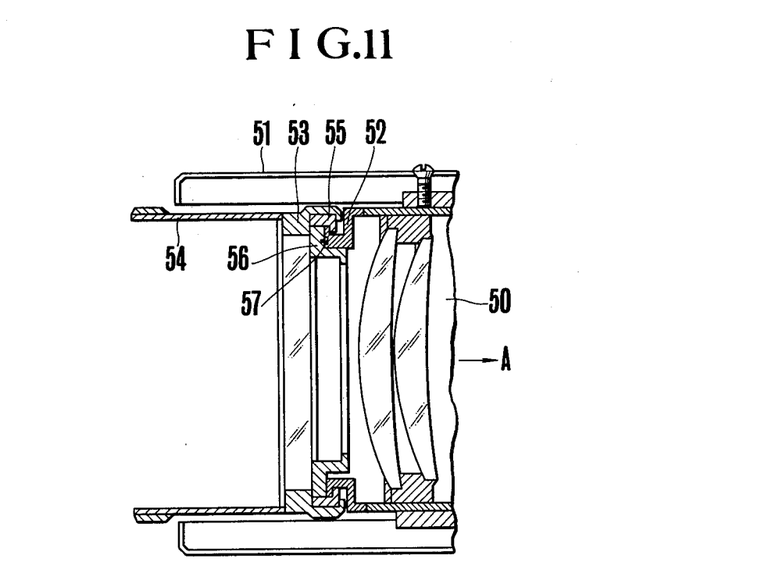
FIG. 11 shows an example of application of the present coupling device to a combination of a filter and an object lens.

FIG. 11 shows an example of application of the coupling device of the invention to a combination of a filter and an objective lens. As the objective lens 50 which may be of the zoom type carries a hood 51 at the front end thereof, the present invention provides an advantage with regard to the coupling of the filter to the lens. A bayonet member 52 is affixed to the front end of the zoom lens holder, and has a recess formed at the abutment shoulder thereof to receive a relative angular position defining pin 57 when the filter 58 is attached to the lens 50. The filter 58 is fixedly mounted in a front half of the inner diameter of a holder ring 53 which fixedly carries an elongated tube body 54 serving as a hood. In an interior annular recess formed in the rear half of the holder ring 53 is provided a bayonet member 55 affixed thereto. Freely fitted to an interior annular recess of the bayonet coupling 55 is an adapter shell 56 whose front end is seated on the radial shoulder of the holder ring 53. A detent mechanism of a construction similar to that of the mechanism 13, 14 and 15 of FIG. 4 is also provided between the adapter shell 56 and the holder ring 53. The filter attachment of such construction may be coupled to the lens mounting through the lens hood 51 in such a manner that after the filter holder ring 53 is inserted into the hood 51 by grasping the filter hood 54 with the pin 57 entering the corresponding recess, the operator turns the hood 54 about the optical axis of the lens 50 to achieve frictional engagement of the bayonets 52 and 55.

It will be seen from the foregoing that the present invention contemplates stationary mounting of the adapter in a depending position by imparting independent movement to at least one part of the associated structure so that there is no need of providing an actuator attributed only to the coupling device. Thus, it is made possible to employ the coupling device in establishing a camera system which would be otherwise difficult to achieve in the prior art as the actuator must be provided adjacent the coupling device. The maintenance of the adapter in the stationary state during the rotative movement of the coupling device leads to the design of camera system for higher frequency of use than was previously possible. Further, as the coupling device of the invention is rigidly fixed at one end thereof to the attachment, there is a reduced possibility of staggering relative movement between the attachment and associated basic structure, so that the complete camera system secures mechanical and optical performances with improved accuracy.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

What is claimed is:

1. An interchangeable lens assembly for a camera comprising:
   lens barrel means having operative components of said lens assembly mounted therewith;
   coupling means fixed on said lens barrel means adapted to be brought into engagement with complementary coupling means on said camera for releasably mounting said lens assembly in operative position on said camera;
   adapter means mounted on said lens barrel means in rotative relationship relative thereto for establishing predetermined relative positioning between said interchangeable lens assembly and said camera; and
   releasable interlocking means including means for locking said lens barrel means in rotatively fixed engagement with said adapter means when said lens barrel means and said adapter means are in a predetermined position relative to each other and means for releasing said fixed engagement when said interchangeable lens assembly is brought into mounting engagement with said camera;
   said coupling means being configured to enable disengagement of said interchangeable lens assembly from said camera when said lens barrel means is returned to said predetermined position relative to said adapter means.

2. An interchangeable lens assembly for a camera comprising:
   lens barrel means having operative components of said lens assembly mounted therewith;
   coupling means on said lens barrel means adapted to be rotated in fixed engagement therewith for bringing said coupling means into releasable engagement with complementary coupling means on said camera for mounting said lens assembly in operative position on said camera;
   adapter means mounted on said lens barrel means in rotative relationship relative thereto, said adapter means including retainer means adapted to cooperate with complementary retainer means on said camera for holding said adapter means rotatively fixed relative to said camera; and
   releasable interlocking means for locking said lens barrel means in rotatively fixed engagement with said adapter means when said lens barrel means and said adapter means are in a predetermined rotative position relative to each other and for releasing said fixed engagement when said interchangeable lens assembly is brought into mounting engagement with said camera.

3. An interchangeable lens assembly for a camera comprising:
   lens barrel means having operative components of said lens assembly mounted therewith;
   coupling means on said lens barrel means adapted to be brought into engagement with complementary coupling means on said camera for releasably mounting said lens assembly in operative position on said camera;
   adapter means mounted on said lens barrel means in rotative relationship relative thereto for establishing predetermined relative positioning between said interchangeable lens assembly and said camera; and
   holding means holding said lens barrel means and said adapter means in a predetermined position relative to each other and enabling relative rotation therebetween when said interchangeable lens assembly is brought into mounting engagement with said camera.

4. An interchangeable lens assembly for a camera comprising:
   lens barrel means having at least one operative component of said lens assembly mounted therewith;
   coupling means fixed on said lens barrel means adapted to be brought into engagement with complementary coupling means on said camera for releasably mounting said lens assembly in operative position on said camera; adapter means mounted on said lens barrel means in rotative relationship relative thereto for establishing predetermined relative positioning between said interchangeable lens assembly and said camera; and
   retainer means adapted to be operatively interposed between said adapter means and said camera for retaining said adapter means in fixed rotative position relative to said camera during mounting and dismounting of said interchangeable lens assembly.

5. An interchangeable lens assembly capable of being manually mounted into and dismounted from operative engagement with a camera body by grasping a lens barrel assembly means of said interchangeable lens assembly at any of a plurality of locations on said lens barrel assembly means, said interchangeable lens assembly comprising:
   lens barrel assembly means having lens component means operatively mounted thereon;
   coupling means fixedly mounted relative to said lens barrel assembly means adapted to be engaged with and disengaged from complementary coupling means on said camera body to enable said interchangeable lens assembly to be mounted and locked in operative engagement with said camera body and dismounted therefrom;
   adapter means mounted on said lens barrel assembly means to enable relative rotation therebetween and operative to be brought into engagement with said camera body during mounting of said interchangeable lens assembly thereon;
   retainer means adapted to be brought into engagement with complementary retainer means on said camera body for retaining said adapter means in fixed rotative position relative to said camera body during said mounting and dismounting of said interchangeable lens assembly; and releasable interlocking means interposed between said adapter means and said lens barrel assembly means for rotatively interlocking said adapter means relative to said lens barrel assembly means when said interchangeable lens assembly is dismounted from said camera body;

said interlocking means operating to release said rotative interlocking when said interchangeable lens assembly is brought into mounting position relative to said camera body.

6. A lens assembly according to claim 5 wherein said lens component means include a lens focusing ring and a diaphragm setting ring mounted on said lens barrel assembly means for operative manipulation relative thereto between two terminal positions, said interchangeable lens assembly being adapted to be mounted on and dismounted from said camera body merely by grasping any portion of said lens barrel assembly means including said focusing ring and said diaphragm setting ring.

7. A lens assembly accordng to claim 5 wherein said releasable interlocking means operate to release said rotative interlocking between said adaptor means and said lens barrel assembly means by being brought into abutting relationship with said camera body.

8. A lens assembly according to claim 7 wherein said releasable interlocking means comprise pin means and spring means operatively interposed between said adapter means and said lens barrel assembly means, said spring means being arranged to bias said pin means to a position effecting said rotative interlocking, said pin means being adapted to be brought into abutting relationship with said camera body thereby to be moved against the biasing force of said spring means to release said rotative interlocking.

9. An assembly according to claim 2 wherein said lens assembly may be mounted and dismounted from said camera by rotation relative to said camera of said lens barrel means and wherein said coupling means are configured to require that said lens barrel means and said adapter means be brought into said predetermined rotative position relative to each other before said lens assembly is released from said camera.

10. An assembly according to claims 1, 2, 3 or 4 wherein said releasable interlocking means operate to release said rotatively fixed engagement between said lens barrel means and said adapter means by being brought into abutting relationship with said camera.

11. An assembly according to claims 1, 2, 3 or 4 wherein said lens barrel means include a lens barrel and wherein said operative components include at least one element which is movably mounted on said lens barrel, said assembly further including means bringing said movable element into driving engagement with said lens barrel to enable said lens barrel to be rotated through rotation of said movable elements.

12. An assembly according to claims 1, 2, 3 or 4 wherein said operative components include a diaphragm and a diaphragm ring mounted on said lens barrel for movement relative thereto between two terminal positions for setting of said diaphragm, said assembly including stop means at said two terminal positions bringing said diaphragm ring into rotative driving engagement with said lens barrel.

13. An assembly according to claim 4 wherein said at least one operative component is an optical filter.

14. An assembly according to claim 5 wherein said interlocking means operate to effect rotative interlocking between said adapter means and said lens barrel assembly means when they are rotated to a predetermined position relative to each other.

15. An assembly according to claim 14 wherein said interlocking means include means adapted to be brought into abutting engagement with said camera for releasing said interlocking engagement between said adapter means and said lens barrel assembly means.

16. An assembly according to claim 5 wherein said assembly is configured to require that said adapter means and said lens barrel assembly means be brought to said predetermined relative position wherein said lens barrel assembly means are rotatively interlocked with said adapter means before said assembly can be released from a camera upon which it has been mounted.

17. An assembly according to claims 1, 2, 3, 4 or 5 wherein said coupling means include resilient means for enhancing the sturdiness of the connection which is effected between said coupling means and said complementary coupling means.

18. An assembly according to claim 17 wherein said coupling means comprise bayonet connector means and wherein said resilient means comprise means forming circumferential slits in said bayonet means to develop resilient characteristics in portions thereof.

19. An assembly according to claims 6, 4 or 5 further comprising electrical signal transmission means including connector means mounted on said adapter means in a position to be brought into electrical contact with complementary connector means in said camera for transmitting between said lens assembly and said camera electrical signals representative of the operating condition of said operative components of said lens assembly.

20. An assembly according to claim 19 wherein said connector means on said adapter means operate simultaneously as said retainer means, said connector means being adapted to be brought into fixed rotative engagement with said complementary connector means.

21. An accessory mounting device to be attached to a camera, comprising:

first component means having a coupling means arranged to engage with complementary coupling means of said camera for mounting said accessory mounting device on said camera;

second component means rotatable relative to said first component means, said second component means being arranged to be maintained in a predetermined positional relationship relative to said first component means when said accessory mounting device is dismounted from said camera;

retainer means adapted to cooperate with complementary retainer means on said camera for holding said second component means rotatively fixed relative to said camera; and holding means holding said first component means and said second component means in a predetermined position relative to each other and enabling relative rotation therebetween when said accessory mounting device is brought into mounting engagement with said camera.

* * * * *